United States Patent
Quigley et al.

(10) Patent No.: US 7,629,878 B2
(45) Date of Patent: Dec. 8, 2009

(54) MEASURING INSTRUMENT HAVING LOCATION-CONTROLLED DISPLAY

(75) Inventors: Jon M. Quigley, Lexington, NC (US); Michael D. Blackard, Jamestown, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 320 days.

(21) Appl. No.: 11/910,764

(22) PCT Filed: Apr. 12, 2005

(86) PCT No.: PCT/US2005/012013

§ 371 (c)(1),
(2), (4) Date: Oct. 5, 2007

(87) PCT Pub. No.: WO2006/112811

PCT Pub. Date: Oct. 26, 2006

(65) Prior Publication Data

US 2008/0198042 A1      Aug. 21, 2008

(51) Int. Cl.
   *B60Q 1/00* (2006.01)
(52) U.S. Cl. ............ 340/461; 340/425.5; 340/438; 340/441; 340/539.13; 340/995.27
(58) Field of Classification Search ......... 340/461, 340/425.5, 438, 441, 988, 990, 501, 539.13, 340/995.17, 995.27, 691.1, 691.6, 815.78; 116/62.4, 62.3, 116, 129, 245, 62.1, 62.2, 116/251; 362/23, 28, 29
See application file for complete search history.

(56) References Cited

U.S. PATENT DOCUMENTS 4,054,105 A  *  10/1977  Fegan ................. 116/62.2
4,284,028 A       8/1981  Swanburg
(Continued)

FOREIGN PATENT DOCUMENTS

| JP | 7294624   | 11/1995 |
|----|-----------|---------|
| JP | 7294624 A | 11/1995 |

OTHER PUBLICATIONS

PCT International Search Report and Written Opinion, mailed Jun. 27, 2006, in connection with International Application No. PCT/US2005/012013.

(Continued)

*Primary Examiner*—Toan N Pham
(74) *Attorney, Agent, or Firm*—Potomac Patent Group PLLC

(57) ABSTRACT

A measuring instrument for a vehicle selectively illuminates one of a plurality of scales based on a location of the instrument or includes an indicator that is selectively positioned based on the location of the instrument. The location is determined by a device, such as a Global Positioning Satellite (GPS) receiver (1) or similar receiver of location information, and a location indication is provided to a suitable controller that illuminates or otherwise activates the appropriate scale or that causes an actuator to position the indicator. Such a display has the advantages of eliminating the need for vehicle manufacturers to stock different instruments having different overlays, of lowering the cost of instrumentation by avoiding digital reconfigurable displays, and of overcoming the deficiencies inherent in digital reconfigurable displays. Such a display also improves vehicle safety by making instruments easier to read and reducing the operational burden on the vehicle driver.

14 Claims, 5 Drawing Sheets

U.S. PATENT DOCUMENTS

| | | | |
|---|---|---|---|
| 5,272,463 A * | 12/1993 | Furuya et al. | 340/438 |
| 5,696,704 A | 12/1997 | Semrau | |
| 5,920,256 A | 7/1999 | Toffolo et al. | |
| 5,969,224 A | 10/1999 | Ebara et al. | |
| 6,353,781 B1 | 3/2002 | Spivak | |
| 6,718,906 B2 * | 4/2004 | Quigley et al. | 116/62.4 |
| 6,981,464 B2 * | 1/2006 | Birman et al. | 116/288 |
| 2003/0221606 A1 | 12/2003 | Quigley et al. | |

OTHER PUBLICATIONS

International Preliminary Report on Patentability, issued Oct. 16, 2007, in connection with International Application No. PCT/US2005/012013.

* cited by examiner

MEASURING INSTRUMENT HAVING LOCATION-CONTROLLED DISPLAY

This invention relates to data-indicating instruments and more particularly to data-indicating instruments having several scales of different measurement units, which may be disposed in vehicles like over-the-highway trucks and tractors.

BACKGROUND

Instrument panels in vehicles include instruments that indicate various conditions of the vehicles. For example, a passenger car or an over-the-highway truck typically includes a speedometer that indicates vehicle speed and may include instruments that indicate fuel remaining and coolant temperature, among others.

Such instruments may be analog or digital. An analog instrument typically includes a mechanical indicator, such as a pointer, that moves with respect to a fixed scale. A digital instrument typically includes an electronic display, such as a liquid crystal display (LCD), an electroluminescent or plasma display, or arrays of light-emitting diodes or other light emitters, on which are presented changeable alphanumeric characters or an indicator that changes with respect to a fixed scale.

For either of these types of display, the units of measurement of the indicated parameter are predetermined and may be pre-printed on a bezel or other structure near the indicator or display or may be presented on the electronic display. For example, an analog speedometer may include an indicator needle that rotates with respect to fixed overlay scales in units of miles per hour (mph) and of kilometers per hour (kph).

Several vehicle instruments measure quantities that can have different units, depending on the location of the vehicle. English and metric scales are noted above in connection with a speedometer, but other scales may be in local use. For example, fuel volume may be indicated in English, metric, and/or Imperial units, for example.

Presenting information in measurement units that are appropriate to the location of a vehicle can be important for a number of reasons. For example, a truck driver may be less likely to comply with local speed limits and to avoid running out of fuel if the truck's speedometer and fuel gauge display their information in units different from the units of local speed limit and distance signs. This would improve the safety of the operation of the vehicle.

Accordingly, vehicle manufacturers which sell products world-wide may stock at least two different speedometers, at least two different fuel gauges, etc. to accommodate use of the English and metric measurement systems. As a lower-cost alternative, manufacturers have developed instruments with overlays that include more than one scale, as noted above, with one or the other being the primary scale that has larger characters. An overlay is typically an inked surface that, with backlighting, displays information to the driver with increased contrast ratio and visibility. For example, an overlay with a primary or only miles-per-hour scale is used in speedometers for vehicles that are sold in countries that use the British/English measurement system, and an overlay with a primary or only kilometers-per-hour scale is used in speedometers for vehicles that are sold in countries that use the metric measurement system.

The result of these considerations is a complex electronic instrument cluster that is defined, at least partially, by something as small as the "ink" on the overlay, leading to two different sets of part numbers for what are substantially identical parts that have the same function or show the same information. The different "ink" on these different parts is the different scales (e.g., English or metric) of speed, temperature, pressure, and other gauges. In essence, the clusters are identical except for the overlays.

Digital reconfigurable displays have been developed that present graphic representations of traditional indicators and scale overlays, thereby allowing several different gauges to be presented on one display. One type of reconfigurable display has a transparent electroluminescent display that presents different scales and a mechanical indicator positioned behind the scale display. Such digital reconfigurable displays normally permit a manufacturer to select different gauges to be displayed, such as speed, battery condition(s), oil pressure, water temperature, etc., with appropriate scales depending on the model and/or market of the vehicle.

Some instruments even allow an end user, like a vehicle driver, to toggle between a miles per hour mode where a miles per hour scale is displayed and a kilometers per hour mode where a kilometers per hour scale is displayed. U.S. Pat. No. 5,696,704 to Semrau and No. 4,284,028 to Swanburg describe speedometers having single scales and mechanisms that re-position the pointers according to measurement units selected by the drivers.

U.S. Pat. No. 6,353,781 to Spivak, for example, describes a marine speedometer that uses a standard output of a position-determining navigation unit, such as a LORAN or Global Positioning System (GPS) receiver. Speed information is received from the navigation unit in knots per hour and is shown on a display. A push-button switch causes a microprocessor to convert the speed information from knots to miles per hour for display.

Patent Abstracts of Japan Publication No. 07294624 describes a computer having navigation software and being connected to a GPS receiver. In response to a command, GPS data in the form of miles and world time is converted into a Tokyo system, e.g., kilometers and Japan time.

These kinds of prior devices are not ideal for vehicle instruments that measure quantities that can have different units, depending on the location of the vehicle. The pixels of a low-cost digital display do not define numeric characters that are as "crisp" or well defined as the characters stenciled into an overlay of an analog display, and so such gauges are often deemed unsatisfactory unless an expensive high resolution display is used. In addition, sun glare has a greater effect on digital displays than traditional analog displays.

Another important drawback of prior devices arises from the changeability of the desired "primary" scale in vehicles that operate in parts of the world like North America, where at one minute the "primary" scale should be English units and at the next minute the "primary" scale should be metric units as vehicles cross the border between the U.S. and Canada. A speedometer might have dual scales, i.e., a scale for miles per hour and a scale for kilometers per hour, but both scales are usually visible simultaneously and one of the two scales is always primary. Drivers must thus be alert to look at the proper scale as they drive in one country or the other, which increases the chance of confusion and inadvertent vehicle speed and other operational errors, decreasing vehicle safety.

SUMMARY

There is thus a need to overcome these drawbacks with an instrument that selectively illuminates one of a plurality of scales based on a location of the instrument. The location is determined by a device, such as a Global Positioning Satellite (GPS) receiver or similar receiver of location information, and a location indication is provided to a suitable controller that illuminates or otherwise activates the appropriate scale. Such a display has the advantages of eliminating the need for vehicle manufacturers to stock different instruments having different overlays, of lowering the cost of instrumentation by avoiding digital reconfigurable displays, and of overcoming the deficiencies inherent in digital reconfigurable displays. Such a display also improves vehicle safety by making instruments easier to read and reducing the operational burden on the vehicle driver.

In one aspect of the invention, there is provided a measuring instrument having a location-controlled display for a vehicle. The instrument includes an indicator that indicates a sensed condition of the vehicle; an overlay that includes at least a first scale and a second scale that are visible only when illuminated from behind, and that is positioned with respect to the indicator such that at least one of the first and second scales corresponds to the indicated sensed condition of the vehicle; at least a first light source and a second light source that respectively illuminate the first scale and the second scale in accordance with respective values of a scale illumination signal; and a microcontroller that generates the scale illumination signal, the value of the scale illumination signal being based on a location of the vehicle.

In another aspect of the invention, there is provided a method of selectively displaying information on a measuring instrument according to a location of the instrument. The method includes the steps of determining a location of the measuring instrument; and selectively illuminating one of at least two measurement scales disposed on an overlay, each of the at least two scales being visible only when illuminated from behind and the overlay being positioned with respect to an indicator such that at least one of the first and second scales corresponds to a condition measured by the instrument. The illuminated measurement scale corresponds to the location of the measuring instrument.

In yet another aspect of the invention, there is provided a measuring instrument having a location-controlled display for a vehicle that includes an indicator that indicates a sensed condition of the vehicle through the indicator's position with respect to a scale, an actuator that selectively positions the indicator with respect to the scale in response to a control signal, and a microcontroller that generates the control signal based on a location and the sensed condition of the vehicle.

BRIEF DESCRIPTION OF THE DRAWINGS

The several features, objects, and advantages of the invention will be understood by reading this description in conjunction with the drawings, in which.

DETAILED DESCRIPTION

Applicants' invention is described below in connection with an instrument cluster for a vehicle, such as a heavy truck, but it will be understood that this is done merely for convenience and not limitation. Applicants' instrument cluster may include one or more instruments having plural scales, only one of which is displayed, or easily readable by a vehicle operator, at a time. The particular scale displayed depends on the location of the vehicle, such that the displayed scale has the appropriate units even as the vehicle transitions from one region to another. The region change is sensed by a GPS or similar receiver, which provides a control signal that causes the instrument(s) to change scale(s) to the units of measurements appropriate for the current region, e.g., miles per hour in the United States, and kilometers per hour in Canada and Mexico.

Applicants' invention improves the safe operation of vehicles by reducing strain on drivers and reduces vehicle manufacturing cost by reducing the number of different vehicle parts. As explained in more detail below, an instrument overlay may have two sets of dead-faced alphanumeric information that are selectively activated by separate backlight sources. This combination of separate dead-faced text and numeric characters and separate backlights enables a single scale to appear at any one time.

Figure 1:
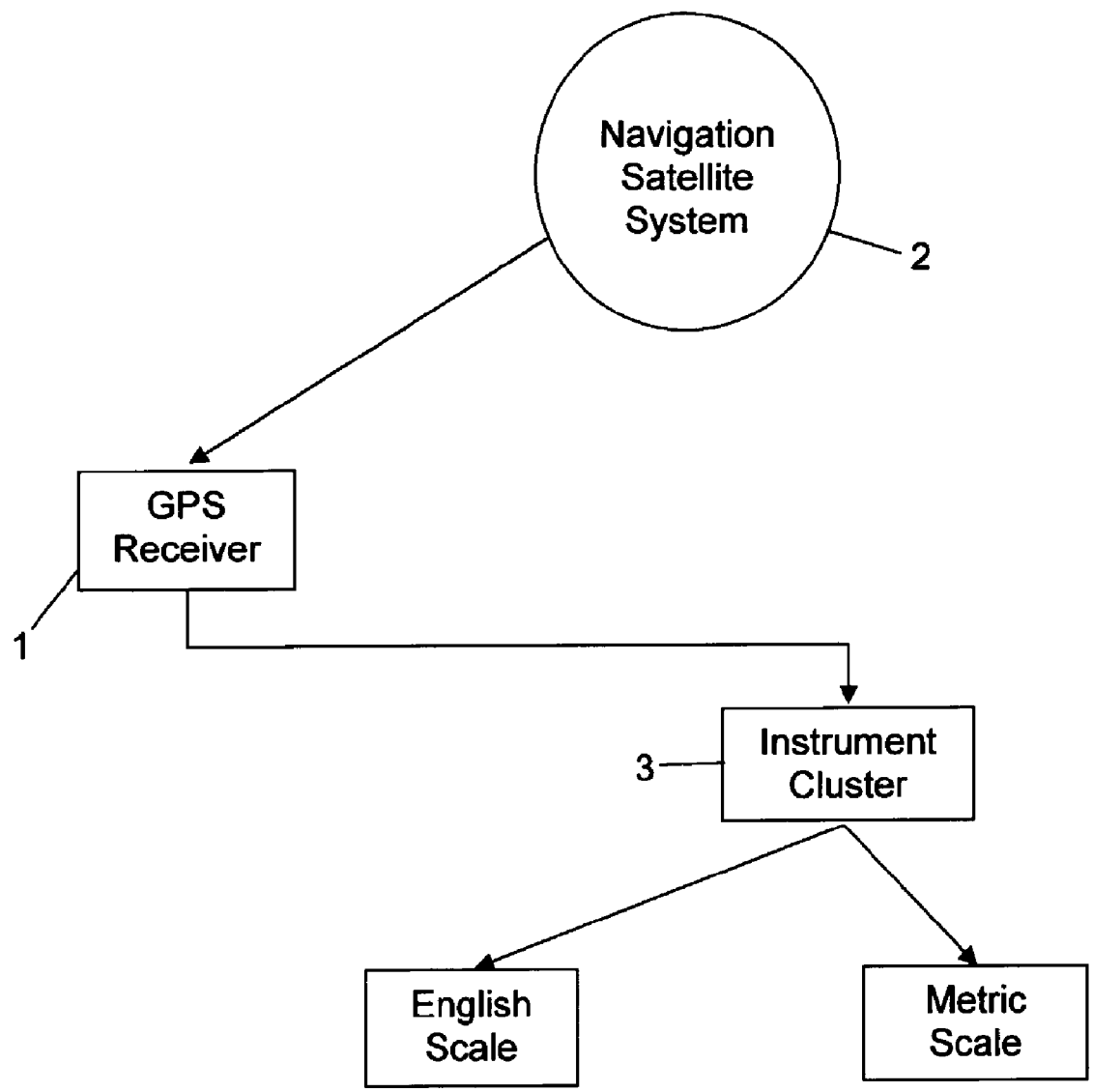
FIG. 1 depicts operation of a vehicle instrument having location-based measurement scales.

An overview of the operation of a vehicle instrument having location-based measurement scales is depicted in FIG. 1. A GPS receiver 1 in a vehicle receives locating information broadcast by a system 2 of earth-orbiting navigation satellites. The GPS receiver 1 generates a location signal that is provided to an instrument cluster 3 in the vehicle. Based on the location signal, the instrument cluster presents information with a measurement scale or scales that is/are appropriate to the location of the vehicle. For example, if the vehicle is traveling north in the United States, the instrument cluster 3 has its speedometer present speed in miles per hour with a mph (English system) scale. As the vehicle proceeds into Canada, the GPS receiver 1 detects the transition and changes its location signal, and in response, the instrument cluster changes the speedometer display to kilometers per hour with a kph (metric system) scale. This change is carried out without the driver's interaction. This improves safety in that the driver does not have to manually switch the gauge into the new scale to match the current road speed limit signs.

It will be appreciated that although a GPS receiver is advantageous in that it is familiar and easily available, other kinds of geolocation device may be used. For example, the receiver 1 may be a LORAN, SAT/NAV, OMEGA, GLONASS, GALILEO, or other type of position determining unit. Moreover besides the location signal, speed and distance information may be provided by the receiver 1 to the instrument cluster for display, eliminating the need for conventional measurement instruments for these parameters. It will be appreciated, however, that while LORAN and OMEGA receivers can provide speed and distance information, their integration times are relatively slow such that speed updates may not be fast enough for user acceptance. In contrast, a GPS receiver can produce speed updates at intervals as short as 0.6 second, which may be virtually instantaneous from a user point of view.

Information provided by the receiver 1 may have any convenient format suitable for the instrument cluster, for example, a format in accordance with an applicable interface standard. Typical GPS receivers produce values of latitude and longitude that are readily converted to locations with respect to boundaries between regions that use different measurement units, for example by finding current latitude and longitude values in a stored table that relates those values to boundaries of interest. It will be appreciated that the location signal needed for location-based measurement scales can be simply an indication of which side of a boundary the receiver 1 is on. The receiver 1 may itself perform such conversions, but if not, the information produced by the receiver 1 may be readily converted by a suitable conversion processor, such as a look-up table or programmed electronic microprocessor, into a location signal or location-appropriate units for display. The receiver 1, conversion table or processor (if necessary), instrument cluster, and associated circuitry may be disposed in a convenient way in the vehicle with a conventional electrical power supply. It will be appreciated, however, that the conversion processor need not be included on the vehicle but could be positioned at a central location, such as a vehicle fleet management office, and accessed by a suitable wireless communication link.

In addition, the instrument cluster may change other instruments in addition to or even instead of the speedometer in response to the location change. For example, a temperature gauge could change from reading in ° F. to ° C.; a fuel gauge could change from reading in U.S. gallons to liters; etc. As explained in more detail below, the behavior of the instrument cluster is advantageously selected by the driver as part of a vehicle set-up procedure.

Figure 2:
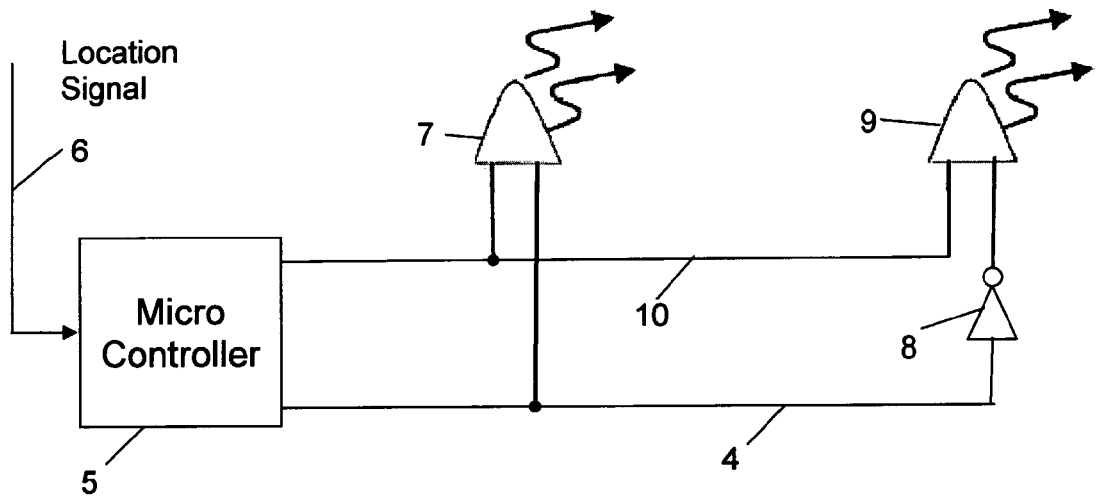
FIG. 2 is a schematic representation of a control system for a dual mode gauge.

FIG. 2 depicts an arrangement of electronic circuits and signals suitable for Applicants' location-controlled instruments. As shown, a scale output signal 4 from a microcontroller 5 is used to turn one scale on and one scale off based on the location signal 6 received by the microcontroller from the receiver 1. The microcontroller 5 provides the scale output signal 4, either directly or through suitable conditioning circuitry, to a first input of a first light source 7, such as a lamp or light-emitting diode (LED), and through an inverter 8 to a first input of a second light source 9. The other inputs of the sources 7, 9 receive a backlight intensity control signal 10 from the microcontroller 5. The signal 10 is advantageously generated by or under the control of the microcontroller 5 such that the backlight intensity is adjustable.

With the scale output signal 4 taking on either a HIGH or a LOW level, the inverter 8 ensures that only one measurement scale is illuminated at any one time during normal operation. For example, when an mph scale is to be illuminated, the microcontroller 5 produces a LOW-level scale signal 4, which turns on the light source 7 and, by operation of the inverter 8, turns off the light source 9. The opposite effects are obtained when the microcontroller 5 produces a HIGH-level scale signal 4.

As shown in FIG. 2, when there are only two alternative measurement scales, there need be only one binary signal 4 and one inverter 8 (e.g., a transistor) to turn "off" the scale not being used. More than two scales can be selectively controlled with a multilevel signal, such as a tri-level signal, and suitable logic circuitry. If only one scale needs to be displayed, the signal 4 can be tied HIGH (or LOW) to allow only one of the scales to be back-lit. Additionally, it will be understood that default values of the signals 4, 10 can be provided by suitably programming the microcontroller 5. Moreover, it will be understood that other kinds of signals, such as digital or logic signals, may be used with appropriate components to obtain substantially similar operation.

Figure 3:
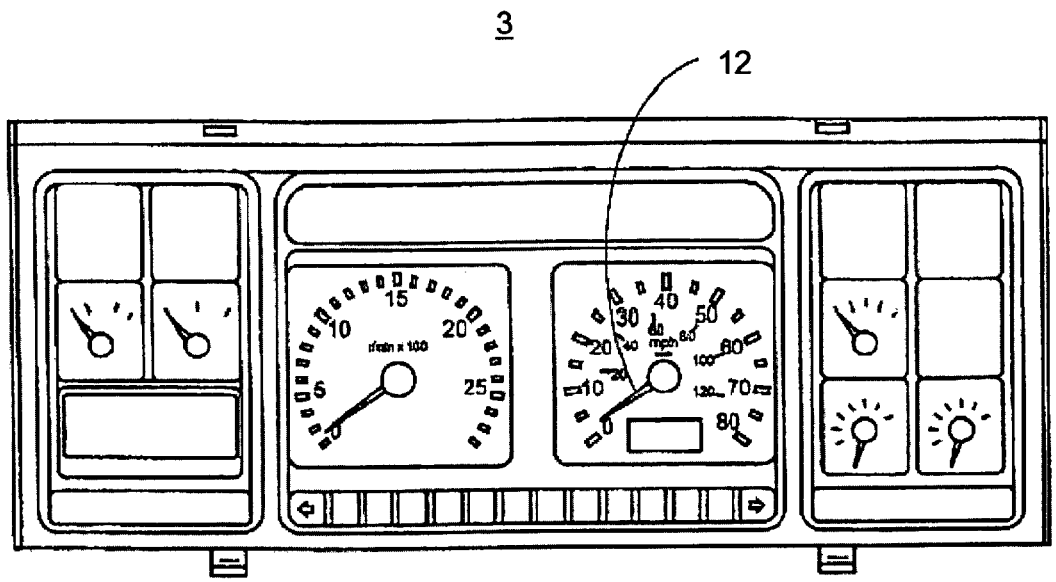
FIG. 3 is a front view of an instrument cluster for a vehicle.

FIG. 3 is a front view of an instrument cluster 3 having a speedometer with an indicating needle 12 disposed in the cluster 3. An overlay for the speedometer is described in more detail below. Similar overlays may be provided for other instruments provided in the cluster 3. The needle 12 may be a mechanical indicator coupled to a motor, such as a stepper motor, servo motor, or other known mechanism for moving the indicator 12, positioned behind the needle and overlay. In a conventional way, an electronic controller such as the microcontroller 5 controls the motor to position the indicator 12 with respect to the overlay or the controller may itself generate signals suitable for displaying the indicator in the appropriate position with respect to the overlay.

Figure 4A:
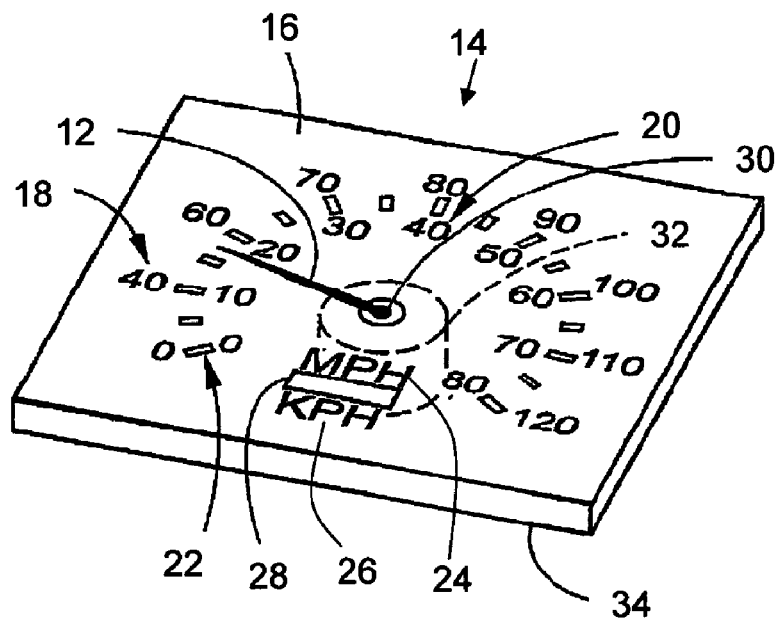
FIGS. 4A, 4B, and 4C together compose an exploded perspective view of an overlay (FIG. 4A), a light guide (FIG. 4B), and a lamp assembly (FIG. 4C) in one embodiment of a vehicle instrument having location-based measurement scales.
Figure 4B:
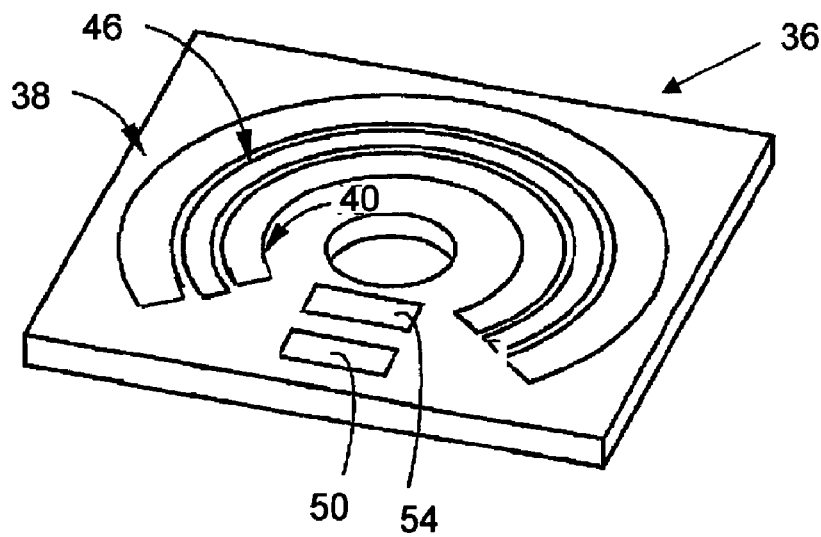
Figure 4C:
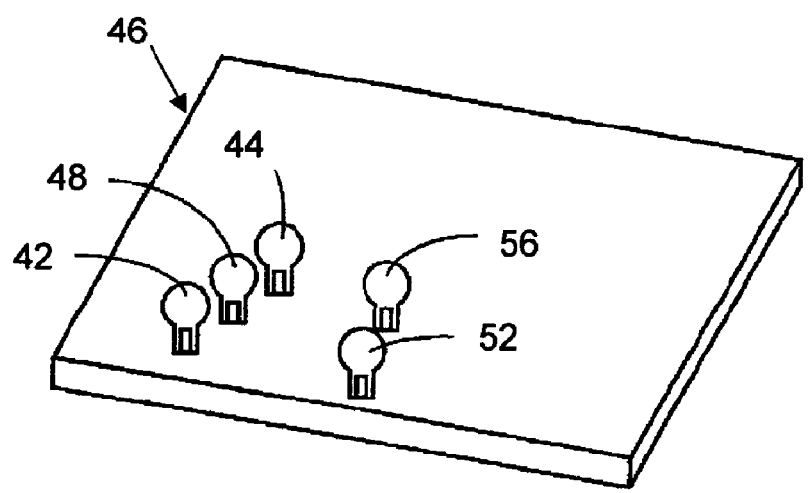
Figure 5A:
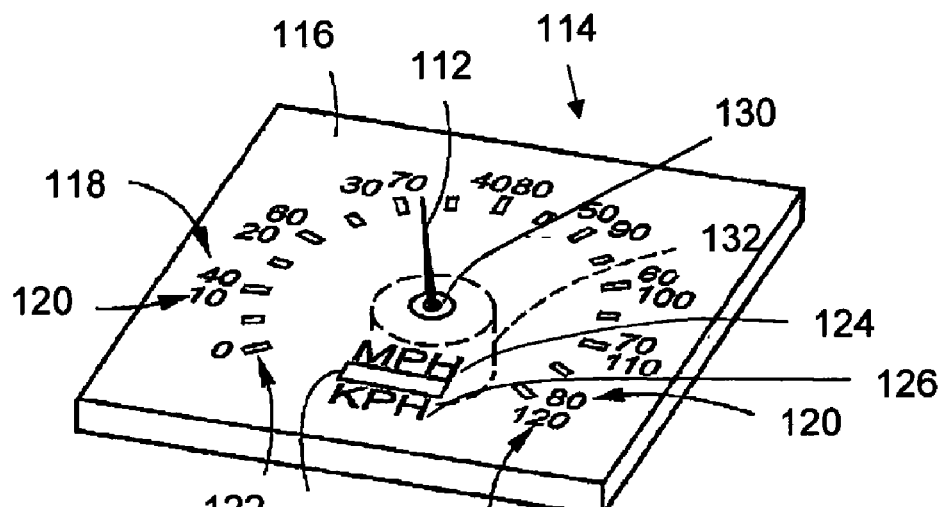
FIGS. 5A, 5B, and 5C together compose an exploded perspective view of an overlay (FIG. 5A), a light guide (FIG. 5B), and a lamp assembly (FIG. 5C) in another embodiment of a vehicle instrument having location-based measurement scales.
Figure 5B:
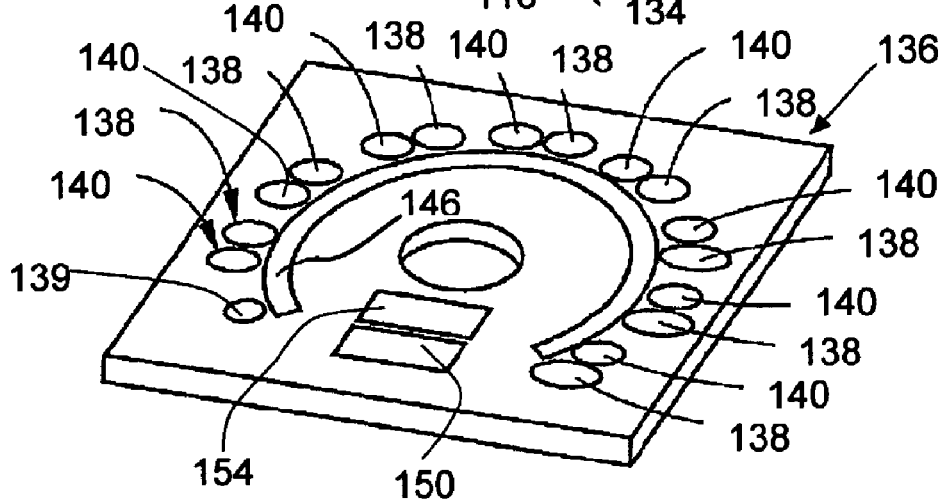
Figure 5C:
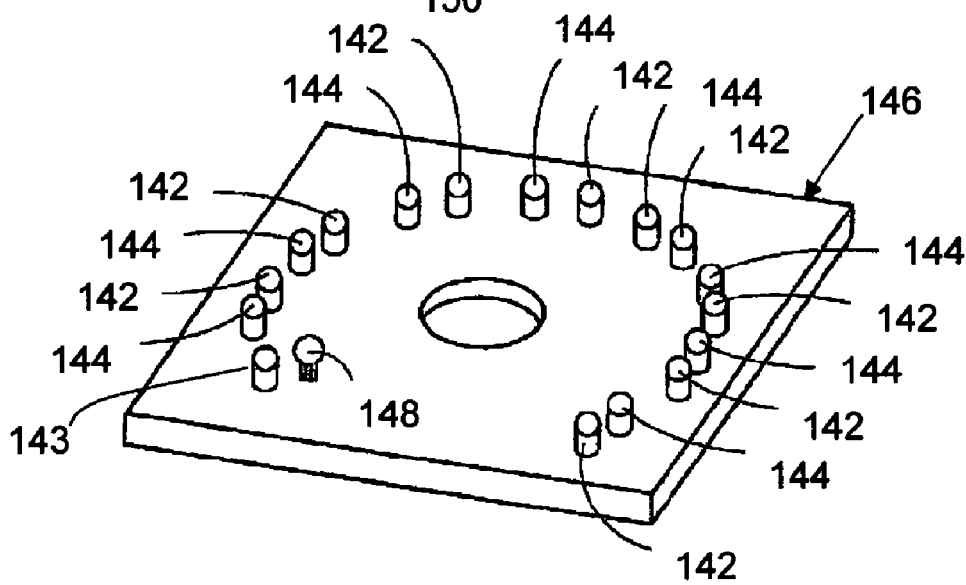

A location-controlled instrument 14 in accordance with Applicants' invention advantageously but not necessarily includes an indicator 12, an overlay 16 (see FIGS. 4A, 5A), a set of one or more light guides (see FIGS. 4B, 5B), and a set of one or more light sources (see FIGS. 4C, 5C). FIGS. 4A-4C and 5A-5C illustrate exemplary speedometers, in which the overlays 16 have upon them all of the information for metric and English scales. Each scale is preferably "dead faced", which means that the overlay appears to have no numeric or scale values unless there is back-lighting. For example, grey numeric values would be substantially invisible on a dark overlay unless they were back-lit. Aspects of such instruments and overlays are described in U.S. Pat. No. 6,718,906 to J. Quigley et al.

Referring to FIG. 4A for example, the indicator 12 of an instrument 14 such as a speedometer for a motor vehicle moves in response to a sensed condition of the vehicle and is positioned in front of the overlay 16. The overlay 16 includes a first, kilometers-per-hour scale 18, comprising the numerals 0, 40, 60, 70, etc., and a second, miles-per-hour scale 20, comprising the numerals 0, 10, 20, 30, etc. A set 22 of graduations is also defined on the overlay 16. As shown, the set 22 of graduations is used with both scales 18, 20, although it will be appreciated that plural sets of graduations could be defined on the overlay 16 and used for respective scales. The overlay 16 further includes an MPH indicator 24 and a KPH indicator 26 defined by corresponding letters on the overlay 16 that are "dead faced", as well as possibly a transparent window or opening 28 for an odometer. The overlay 16 may include a hole 30 for a shaft (not shown) of a motor 32 that moves the indicator 12.

It will be apparent to those skilled in the art that the numeric characters of the kph scale 18 could be positioned radially inward of the set 22 of graduations and that the numeric characters of the mph scale 20 could be positioned radially outward of the set 22 of graduations.

The first and second scales 18, 20 are preferably "dead faced", i.e., they are visible only when illuminated from a back side 34 of the overlay 16 in response to a suitable control signal provided by the microcontroller 5 or similar device. When there is no backlighting, the areas that define the scales 18, 20 blend into the rest of the overlay 16. The set 22 may also be "dead faced", although when a single set 22 is used, the set may be defined in such a way that the graduations are visible when backlighting is not present. For example, the graduations may simply be printed on a front side of the overlay 16. When plural sets 22 are provided, for example when one set of graduations is associated with a kilometers-per-hour scale 18 and a second set of graduations is associated with a miles-per-hour scale 20, the sets should be "dead faced" so that they are not visible unless there is backlighting. The set of graduations for the kph scale would be illuminated when the kph scale 18 is illuminated, and the set of graduations for the mph scale would be illuminated when the mph scale 20 is illuminated.

Referring to FIG. 4B, a group 36 of light guides is disposed behind the overlay 16 such that light from a group of selectively energizable light sources depicted in FIG. 4C illuminates either the first scale 18 or the second scale 20. A light guide 38 is used to illuminate radially outward numeric characters that define the kph scale 18, and a light guide 40 is used to illuminate radially inward numeric characters of the mph scale 20. Referring to FIGS. 4B and 4C, the arcuate light guide 38 directs light from a lamp 42, and the arcuate light guide 40 directs light from a lamp 44. Such light guides and lamps are commercially available. The lamps 42, 44 or equivalent LEDs may be positioned on a printed circuit board 46 that is mounted in registration with the guides 16, 18. With the lamps 42, 44 being selectively energized based on the scale output signal 4, light is directed to a desired region of the overlay and a desired scale is made visible.

FIGS. 4B, 4C also show an arcuate light guide 46 and a lamp 48 for illuminating the set 22 of graduations. It will be understood from the discussion above, however, that a set of graduations need not be illuminated if desired. FIGS. 4B, 4C also show a KPH indicator light guide 50 and lamp 52, and an MPH indicator light guide 54 and lamp 56. The light guide 50 directs light from the lamp 52 to illuminate the KPH indicator 26, and the light guide 54 directs light from the lamp 56 to illuminate the MPH indicator 24.

It will be appreciated that in this way, each scale has its own separately controlled back-lighting. In a conventional way, a light guide directs the back-lighting to the isolated area required. The light guide guides the light to each of the individual areas (metric/English) incrementally, and prevents the light for one of the scales or text illumination areas from impacting adjacent areas. The light guide can be tooled either for illumination of one or more discrete areas or for illumination of extended areas, such as an arc that covers an entire scale range.

Moreover, light emitters like LEDs are advantageous as back-light sources due to their low beam divergence and low heat generation. The low beam divergence enables illumination of only the area immediately in front of the emitter, e.g., behind a scale numeral. Illumination can be accomplished through the use of a "strip light guide" or through the use of plural discrete LEDs and plural isolated light guides behind the numeric values.

FIGS. 5A, 5B, 5C depict another embodiment of a location-controlled instrument in accordance with Applicants' invention. It will be appreciated that the speedometer depicted in FIGS. 5A-5C is substantially similar to the speedometer depicted in FIGS. 4A-4C, and so reference numerals in FIGS. 5A-5C are increased by 100 with respect to reference numerals in FIGS. 4A-4C and indicate corresponding parts.

In FIG. 5A, the numeric characters of the kph scale 118 and the mph scale 120 are all positioned radially outward of the set 122 of graduations. Even so, each scale 118, 120 is selectively illuminated from behind the overlay 116 according to the location of the instrument 114.

FIG. 5B depicts first and second sets of light guides 138, 140 used to illuminate the kph scale 118 and mph scale 120, respectively, of the overlay 116 shown in FIG. 5A. The first set of guides 138 directs light from a first set of LEDs 142 (indicated in FIG. 5C) or lamps to back-light the kph scale 118 on the overlay 116, and the second set of guides 140 directs light from a second set of LEDs 144 or lamps to back-light the mph scale 120 on the overlay 116. The guides 138, 140 are advantageously formed as apertures or the like in a plate 136, which may be made of tooled plastic or another suitable material, that fits between a printed circuit board 146 (FIG. 5C) having the LEDs 142, 144 and the overlay 116 (FIG. 5A). The plate 136 includes cutouts that define the light guides 138, 140 positioned behind respective numeric characters of the kph and mph scales.

A light source for the set 122 of graduations includes a lamp or LED 148 and a graduation light guide 146. The MPH and KPH indicators 124, 126 (FIG. 5A) are illuminated by light guides 154, 150, respectively (FIG. 5B) and lamps (not shown in FIG. 5C for clarity). In addition, a light source for the zero character of the kph and mph scales 118, 120 includes a light guide 139 and an LED or lamp 143.

It will be appreciated that when an LED is used instead of a lamp to illuminate characters of the kph or mph scales or set of graduations, a light guide need not be more than an aperture between the overlay and the LED. The low beam divergence typical of such devices precludes illumination of neighboring characters. It will also be appreciated that one or more of the lamps and LEDs may provide light having a color different from the color of light provided by other lamps and LEDs. A color difference between scales can help make it obvious to the driver that the scale has changed.

As explained above, the behavior of the instrument cluster 3 is advantageously selected by the driver as part of a vehicle set-up procedure. A suitable set-up menu can be presented to the driver on an input/output display portion of the cluster, for example, by execution of suitable program instructions by the microcontroller 5. The set-up menu enables the operator to modify the cluster, including the speedometer, temperature, pressure, and other gauges, so that information is displayed in a selected one of several sets of measurement units, for example either metric or English units. The microcontroller 5 executes instructions and produces signals that cause the scale visible to the operator to change along with the pointer position as appropriate. Below is a suitable menu selection tree to change between English and metric units:

Instrument set up
Scale
   English or Metric
   Toggle all scales upon geographic region change
   Toggle only speed information upon geographic change It will be appreciated that this is just one example; other scale changes and combinations of scale changes can be programmed. Upon execution of a location-based scale change, the instrument cluster 3 back-lights the selected scale and moves the pointer to the appropriate position on the new scale for each instrument selected during set-up.

It was noted above that the position of an indicating needle 12 may be controlled by a motor 32 that is in turn controlled by the microcontroller 5. It will thus be appreciated that a single set of scale characters may be presented on an overlay that is disposed behind the needle, and a measurement-units change can be reflected in a suitable change in how the microcontroller causes the needle to move. Moreover, the needle and/or scale characters described here need not be tangible objects but can be representations on a suitably dimensioned digital reconfigurable display or optical projections in a head-up display.

Figure 6:
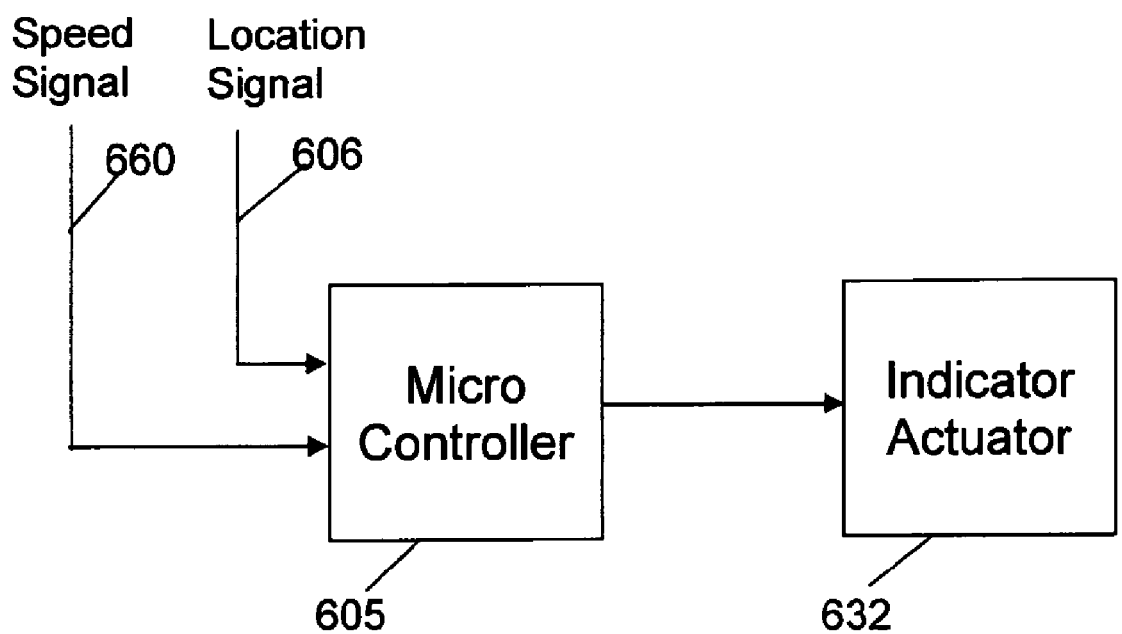
FIG. 6 is a schematic representation of a control system for a controllable indicator.

As shown in FIG. 6, a location signal 606 from a geo-location receiver and a speed signal 660 are provided to a microcontroller 605, which uses those signals to generate a control signal for an indicator actuator 632. In response to the control signal, the indicator actuator moves an indicating needle or other device in accordance with the appropriate measurement units.

The speed signal 660 may be a series of pulses generated by a suitable sensor, such as a sensor located on the output shaft of a vehicle's transmission or elsewhere. Such a speed signal can be converted to a signal in either mph or kph by the microcontroller 605 or another processor through a calculation that uses the outside diameter of the vehicle's drive tire and the final output ratio at the axle. The speed signal may be transmitted to the instrument cluster, which has the driver's selection of miles or kilometers and the geo-location information. The microcontroller can either use the speed signal as transmitted, or convert the signal from one measurement system to another system, and control the indicator actuator 632 accordingly. As noted above, the actuator 632 may be an electric stepper motor, which is currently believed to have advantages of accuracy and ease of control, or an air-core actuator, which employs two wire coils and a phase difference between electric signals applied to the coils to set the needle position. Other devices for providing precisely controlled linear or rotational movement of the indicating needle may also be used.

The procedures described above are carried out repetitively as necessary to respond to location changes. To facilitate understanding, many aspects of Applicants' invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, Applicants' invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, Applicants' invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A measuring instrument having a location-controlled display for a vehicle, comprising:
    an indicator that indicates a sensed condition of the vehicle;
    an overlay that includes at least a first scale and a second scale that are visible only when illuminated from behind, and that is positioned with respect to the indicator such that at least one of the first and second scales corresponds to the indicated sensed condition of the vehicle;
    at least a first light source and a second light source that respectively illuminate the first scale and the second scale in accordance with respective values of a scale illumination signal; and
    a microcontroller that generates the scale illumination signal, the value of the scale illumination signal being based on a location of the vehicle.

2. The measuring instrument of claim 1, further comprising a receiver in communication with the microcontroller that is adapted to receive location information and to provide to the microcontroller an indication of the location of the vehicle.

3. The measuring instrument of claim 2, wherein the receiver is a global positioning system receiver.

4. The measuring instrument of claim 1, wherein the measuring instrument is disposed in an instrument cluster that includes an input/output display, and the microcontroller generates the scale illumination signal based on selections from a menu presented on the display.

5. The measuring instrument of claim 4, wherein the sensed condition of the vehicle is indicated in either English measurement units or in metric measurement units based on selections from the menu.

6. A method of selectively displaying information on a measuring instrument according to a location of the instrument, comprising the steps of:
    determining a location of the measuring instrument; and
    selectively illuminating one of at least two measurement scales disposed on an overlay, each of the at least two scales being visible only when illuminated from behind and the overlay being positioned with respect to an indicator such that at least one of the first and second scales corresponds to a condition measured by the instrument;
    wherein the illuminated measurement scale corresponds to the location of the measuring instrument.

7. The method of claim 6, wherein the location is determined by a receiver that receives broadcast location information.

8. The method of claim 7, wherein the location information is broadcast by a global positioning system.

9. The method of claim 6, wherein the measured condition is indicated in either English measurement units or in metric measurement units based on the location of the measuring instrument.

10. A measuring instrument having a location-controlled display for a vehicle, comprising:
    an indicator that indicates a sensed condition of the vehicle through the indicator's position with respect to a scale;
    an actuator that selectively positions the indicator with respect to the scale in response to a control signal; and
    a microcontroller that generates the control signal based on a location and the sensed condition of the vehicle.

11. The measuring instrument of claim 10, further comprising a receiver in communication with the microcontroller that is adapted to receive location information and to provide to the microcontroller an indication of the location of the vehicle.

12. The measuring instrument of claim 11, wherein the receiver is a global positioning system receiver.

13. The measuring instrument of claim 10, wherein the measuring instrument is disposed in an instrument cluster that includes an input/output display, and the microcontroller generates the control signal based on selections from a menu presented on the display.

14. The measuring instrument of claim 13, wherein the sensed condition of the vehicle is indicated in either English measurement units or in metric measurement units based on selections from the menu.

* * * * *